US008687480B2

(12) United States Patent
Jia et al.

(10) Patent No.: US 8,687,480 B2
(45) Date of Patent: Apr. 1, 2014

(54) SYSTEMS AND METHODS FOR SC-FDMA TRANSMISSION DIVERSITY

(75) Inventors: Ming Jia, Ottawa (CA); Jianglei Ma, Kanata (CA); Peiying Zhu, Kanata (CA); Wen Tong, Ottawa (CA); Hua Xu, Nepean (CA); Hang Zhang, Nepean (CA)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 12/995,206

(22) PCT Filed: Jun. 12, 2009

(86) PCT No.: PCT/CA2009/000830

§ 371 (c)(1), (2), (4) Date: Nov. 30, 2010

(87) PCT Pub. No.: WO2009/149561

PCT Pub. Date: Dec. 17, 2009

(65) Prior Publication Data

US 2011/0075651 A1 Mar. 31, 2011

(51) Int. Cl.

| | |
|---|---|
| ***H04J 11/00*** | (2006.01) |
| ***H04B 7/208*** | (2006.01) |
| ***H04W 4/00*** | (2009.01) |
| ***H04L 27/28*** | (2006.01) |
| ***H04B 7/02*** | (2006.01) |

(52) U.S. Cl.
USPC ........... 370/208; 370/210; 370/344; 370/328; 375/260; 375/267; 375/295

(58) Field of Classification Search
USPC ......... 370/206, 208, 210, 328, 335–336, 338, 370/342, 344; 375/260, 267, 295; 455/101, 455/452.1, 452.2
See application file for complete search history.

(56) References Cited

U.S. PATENT DOCUMENTS

| | | | | |
|---|---|---|---|---|
| 7,599,327 | B2 * | 10/2009 | Zhuang | 370/329 |
| 7,623,442 | B2 * | 11/2009 | Laroia et al. | 370/208 |
| 7,684,504 | B2 * | 3/2010 | Aziz | 375/260 |
| 7,778,151 | B2 * | 8/2010 | Bertrand et al. | 370/208 |
| 7,804,910 | B2 * | 9/2010 | Shen et al. | 375/267 |
| 7,933,350 | B2 * | 4/2011 | Liu et al. | 375/260 |
| 7,961,591 | B2 * | 6/2011 | Abedi | 370/208 |
| 8,094,638 | B2 * | 1/2012 | Muharemovic et al. | 370/342 |
| 8,285,226 | B2 * | 10/2012 | Lundby et al. | 455/101 |
| 2006/0067421 | A1 * | 3/2006 | Walton et al. | 375/267 |

(Continued)

OTHER PUBLICATIONS

Frank T. et al.: "Low Complexity Multi Carrier Multiple Access with Cyclic Delay Diversity", Proceedings of the International IEEE/ITG Workshop on Smart Antennas (WSA06), Mar. 1, 2006, pp. 1-7, XP008147475.

Cristina Ciochina et al.: "Single-Carrier Space-Frequency Block Coding: Performance Evaluation", Vehicular Technology Conference, 2007. VTC-2007 Fall. 2007 IEEE 66th, IEEE, PI, Sep. 1, 2007, pp. 715-719, XP031147497.

(Continued)

*Primary Examiner* — Candal Elpenord
(74) *Attorney, Agent, or Firm* — Paradigm IP Law, PC; Ross L. Franks

(57) ABSTRACT

The present application provides methods, devices and transmitters that mitigate increases in peak to average power ratio (PAPR) from transmission diversity in a single carrier frequency division multiple access (SC-FDMA) modulated uplink A PAPR preserving precode matrix hopping method that utilizes cyclic shift delays is provided, as well as a sub-band based transmit diversity scheme. The present application also provides methods, devices and transmitters that relax the scheduling restrictions associated with uplink scheduling in the LTE standard.

6 Claims, 7 Drawing Sheets

(56) References Cited

U.S. PATENT DOCUMENTS

2007/0041457 A1 2/2007 Kadous et al.
2007/0115795 A1 5/2007 Gore et al.
2008/0075184 A1* 3/2008 Muharemovic et al. ...... 375/260
2008/0225965 A1* 9/2008 Pi et al. ......................... 375/260
2008/0298502 A1* 12/2008 Xu et al. ....................... 375/299
2009/0290657 A1* 11/2009 Howard et al. ............... 375/267

OTHER PUBLICATIONS

Extended European Search Report for European Patent Application No. 09761219.6 dated Nov. 6, 2012, 11 pages.

* cited by examiner

SYSTEMS AND METHODS FOR SC-FDMA TRANSMISSION DIVERSITY

CROSS REFERENCE TO RELATED APPLICATIONS

This application claims the benefit of and is a National Phase Entry of International Application No. PCT/CA2009/000830 filed Jun. 12, 2009, and claims the benefit of prior U.S. Provisional Application No. 61/061,013 filed Jun. 12, 2008, which are both hereby incorporated by reference in their entirety.

FIELD OF APPLICATION

The application relates to wireless communication and more specifically to methods and systems for uplink communication in single carrier frequency division multiple access (SC-FDMA).

BACKGROUND OF THE APPLICATION

The Third Generation Partnership Project (3GPP) has adopted orthogonal frequency division multiple access (OFDMA) to achieve higher bit rates.

In cellular applications, one advantage of OFDMA is its robustness in the presence of multipath signal propagation. The immunity to multipath derives from the fact that an OFDMA system transmits information on M orthogonal frequency carriers, each operating at 1/M times the bit rate of the information signal. However, the OFDMA waveform exhibits very pronounced envelope fluctuations resulting in a high peak-to-average power ratio (PAPR). Signals with a high PAPR require highly linear power amplifiers to avoid excessive intermodulation distortion. To achieve this linearity, the amplifiers are operated with a large backoff from their peak power. The result is low power efficiency, which places a significant burden on portable wireless terminals.

Another problem with OFDMA in cellular uplink transmissions derives from the inevitable offset in frequency references among the different terminals that transmit simultaneously. Frequency offset destroys the orthogonality of the transmissions, thus introducing multiple access interference. To overcome these disadvantages, 3GPP has adopted a modified form of OFDMA for uplink transmissions in the "long-term evolution (LTE)" of cellular systems. The modified version of OFDMA, is referred to as single carrier FDMA (SC-FDMA).

As in OFDMA, the transmitters in an SC-FDMA system use different orthogonal frequencies (subcarriers) to transmit information symbols. However, they transmit the subcarriers sequentially, rather than in parallel. Relative to OFDMA, this arrangement reduces considerably the envelope fluctuations in the transmitted waveform. Accordingly, SC-FDMA signals have inherently lower PAPR than OFDMA signals. However, in cellular systems with severe multipath propagation, the SC-FDMA signals arrive at a base station with substantial intersymbol interference.

Therefore, a base station typically employs adaptive frequency domain equalization to cancel this interference when attempting to receive an SC-FDMA transmission. This arrangement makes sense in a cellular system because it reduces the burden of linear amplification in portable user equipment (UE) at the cost of complex signal processing (frequency domain equalization) at the base station.

Low PAPR is a unique property of SC-FDMA, which makes SC-FDMA very suited to use in the LTE uplink access method. Due to low PAPR, SC-FDMA is able to potentially provide larger coverage, consume less power amplifier (PA) power, and cost less, compared to, for example, OFDMA.

The current LTE standard employs SC-FDMA in the physical uplink sync channel for data transmission in the uplink. However, in order to preserve the low PAPR property, the sub-carriers assigned to a UE for SC-FDMA need to be either evenly distributed or sub-band based, i.e. sub-band of consecutive sub-carriers. The current LTE standard has adopted the sub-band based approach, so that a UE is assigned a sub-band of consecutive sub-carriers in the LTE uplink for data transmission. For the LTE UL control channel PUCCH (physical uplink control channel), the low PAPR performance is achieved by transmitting frequency domain low PAPR sequences, i.e., the sequences have low PAPR after an IFFT.

Previous research into SC-FDMA, and as a result the LTE uplink (UL), was generally focused only the use of one transmit antenna. However, it is now clear that for LTE-Advanced, which is the next step in the progression of the LTE standard, more than one antenna will be supported at UE in order to potentially improve coverage and throughput.

Although transmit diversity is well researched for OFDMA, which is utilized in the LTE downlink (DL), the technology developed for OFDMA in the DL cannot be directly transferred to SC-FDMA in the UL. This is generally due to the fact that in order to preserve the low PAPR property of SC-FDMA in the UL, the transmit diversity techniques employed in the uplink must be designed to preserve low PAPR, which is not the case for the diversity techniques developed for the OFDMA DL, as OFDMA does not have low PAPR.

SUMMARY

According to one broad aspect, the application provides a method for single carrier frequency division multiple access (SC-FDMA) uplink transmission diversity in a wireless communication device having $N_A$ antennas, $N_A \geq 2$, the method comprising: for a group of N modulated data symbols: performing an N-point discrete Fourier transform (DFT) on the N modulated data symbols to generate a set of N frequency domain components of the N modulated data symbols; mapping the N frequency domain components of the N modulated data symbols to N sub-carriers in a sub-band M sub-carriers wide (M>N) to generate a set of M complex subcarrier amplitudes; performing an M-point inverse discrete Fourier transform (IDFT) on the set of M complex sub-carrier amplitudes to generate a reference sequence of M discrete time domain values; generating $N_A-1$ cyclic shift delayed versions of the reference sequence of M discrete time domain values; transmitting an SC-FDMA signal on a first one of the $N_A$ antennas using the reference sequence of discrete time domain values; and for each other antenna, transmitting a respective SC-FDMA signal generated using a respective one of the $N_A-1$ cyclic shift delayed versions of the reference sequence of M discrete time domain values.

In some embodiments, $N_A=2$ and generating $N_A-1$ cyclic shift delayed versions of the reference sequence of M discrete time domain values comprises generating a cyclic shift delayed version of the reference sequence of M discrete time domain values that is cycle shifted by M/4 relative to the reference sequence.

In some embodiments, $N_A=4$ and generating $N_A-1$ cyclic shift delayed versions of the reference sequence of M discrete time domain values comprises generating three cyclic shift delayed versions of the reference sequence of M discrete time domain values that are cycle shifted by M/4, −M/4 and M/2 relative to the reference sequence, respectively.

According to another broad aspect, the present application provides a wireless transmitter comprising: a discrete Fourier transformer configured to perform an N-point discrete Fourier transform (DFT) on N modulated data symbols to generate a set of N frequency domain components of the N modulated data symbols; a sub-carrier mapper configured to map the N frequency domain components of the N modulated data symbols to N sub-carriers in a sub-band M sub-carriers wide (M>N) to generate a set of M complex subcarrier amplitudes; an inverse discrete Fourier transformer configured to perform an M-point inverse discrete Fourier transform (IDFT) on the set of M complex sub-carrier amplitudes to generate a reference sequence of M discrete time domain values; a cyclic shift delayer configured to generate $N_A-1$ cyclic shift delayed versions of the reference sequence of M discrete time domain values; and an RF transmitter configured to: for a first antenna, modulate the M sub-carriers of the sub-band sequentially using the reference sequence of discrete time domain values to transmit an SC-FDMA signal on the first antenna; and for each of at least one other antenna, modulate the M sub-carriers of the sub-band sequentially using a respective one of the $N_A-1$ cyclic shift delayed versions of the reference sequence of M discrete time domain values to transmit an SC-FDMA signal on the antenna.

In some embodiments, the at least one other antenna comprises a second antenna, and the cyclic shift delayer is configured to generate a cyclic shift delayed version of the reference sequence of M discrete time domain values that is cycle shifted by M/4 relative to the reference sequence for transmission diversity on the second antenna.

In some embodiments, the at least one other antenna comprises three other antennas, and the cyclic delay shifter is configured to generate three cyclic shift delayed versions of the reference sequence of M discrete time domain values that are cycle shifted by M/4, −M/4 and M/2 relative to the reference sequence, respectively.

According to another broad aspect of the present application, there is provided a wireless device comprising the wireless transmitter in accordance with the first broad aspect.

According to another broad aspect of the present application, there is provided a method for single carrier frequency division multiple access (SC-FDMA) sub-band based transmission diversity, the method comprising: dividing a bandwidth into a plurality of sub-bands; assigning each sub-band to a respective antenna of a plurality of antennas; and transmitting an SC-FDMA signal in each sub-band with the respective antenna assigned to the sub-band.

In some embodiments, the sub-bands of the plurality of sub-bands are each of equal size.

According to another broad aspect of the present application, there is provided a wireless transmitter for single carrier frequency division multiple access (SC-FDMA) sub-band based transmission diversity configured to generate an SC-FDMA signal for transmission in each of a plurality of contiguous sub-bands.

In some embodiments, the wireless transmitter comprises a respective signal processing path for each sub-band, each signal processing path comprising a respective discrete Fourier transformer (DFT).

In some embodiments, each signal processing path comprises a sub-carrier mapper followed by an inverse discrete Fourier transformer after the DFT.

According to another broad aspect of the present application, there is provided a method for uplink adaptive sub-channelization in an SC-FDMA modulated uplink, the method comprising: assigning a wireless device a plurality of non-contiguous sub-bands for SC-FDMA modulated uplink transmission based on an operating power headroom of the wireless device.

In some embodiments, the method further comprises: determining sub-carriers on which the wireless device has fading peaks, wherein assigning the wireless device a plurality of non-contiguous sub-bands comprises assigning the wireless device a plurality of non-contiguous sub-bands for SC-FDMA modulated uplink transmissions based on the operating power headroom of the wireless device and the sub-carriers on which the wireless device has fading peaks.

According to another broad aspect of the present application, there is provided a method in a base station for adaptation of an SC-FDMA modulated uplink connection of a MIMO-capable wireless device, comprising: monitoring an operating power headroom of the wireless device; when the wireless device has sufficient operating power headroom, scheduling multi-codeword rank-1 transmission based on channel strength or at least rank-2 transmission.

According to another broad aspect of the present application, there is provided a method for transmit diversity on a SC-FDMA modulated uplink channel, comprising: for each of a plurality of antennas: precoding a sequence of SC-FDMA modulated symbols based on hopping through a time domain precoding vector that is different for each antenna, and transmitting the plurality of precoded SC-FDMA modulated symbols.

In some embodiments, the elements of the precoding vectors comprise {1} and {j}.

In some embodiments, the plurality of antennas comprises two antennas, and the precoding vector comprises {1,1}, {1,−1}, {1,j} and {1,−j}.

In some embodiments, the SC-FDMA modulated uplink channel comprises forward error correction coded data.

In some embodiments, the SC-FDMA modulated uplink channel comprises the long term evolution (LTE) uplink random access channel (RACH).

Other aspects and features of embodiments of the present application will become apparent, to those ordinarily skilled in the art, upon review of the following description of the specific embodiments of the application.

BRIEF DESCRIPTION OF THE DRAWINGS

Embodiments of the present application will now be described, by way of example only, with reference to the accompanying drawing figures, wherein.

DETAILED DESCRIPTION

In order to preserve the low PAPR property of SC-FDMA, while also exploiting the potential benefits of multi-antenna transmission diversity, one might look to employ an SC-FDMA uplink transmit diversity scheme that has many, if not all, of the following properties:

- preserves the low PAPR property of SC-FDMA;
- provides a full diversity cycle within one SC-FDMA symbol (all entries in the codebook present in each SC-FDMA symbol);
- provides consistent performance regardless of user equipment (UE) speed;
- provides multi-level channel combinations; and
- is relatively easy to implement for the sake of cost efficiency.

While the foregoing refers to considerations for transmit diversity in DFT-based SC-FDMA data channels, such as those used in the LTE UL, such considerations are also applicable to other low PAPR signaling schemes, such as frequency domain low PAPR sequence based control channels in the LTE uplink and other multiple access signaling techniques such as code phase shift keying (CPSK) OFDMA.

Figure 1A:
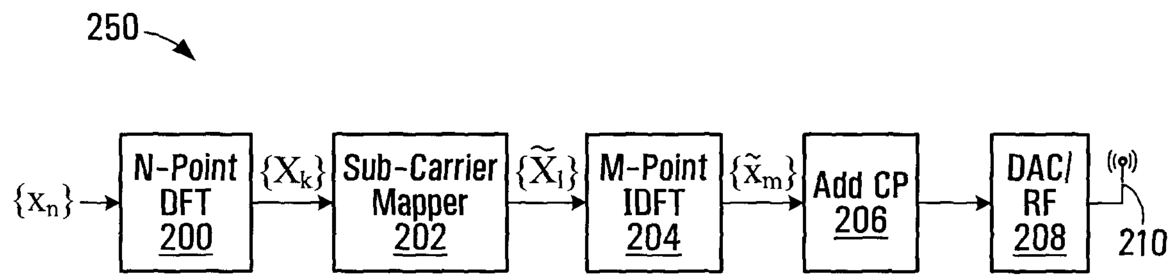
FIG. 1A is a block diagram of a SC-FDMA transmitter.
Figure 1B:
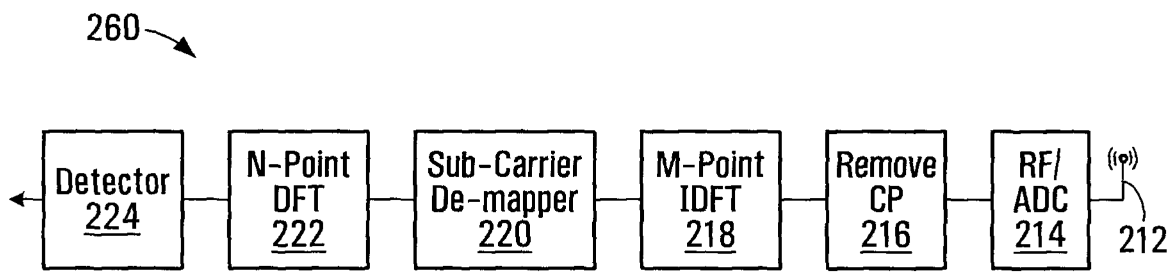
FIG. 1B is a block diagram of a SC-FDMA receiver.

Aspects of SC-FDMA signaling are now discussed with reference to FIGS. 1A and 1B, which provide examples of a conventional SC-FDMA transmitter and receiver for single-in single-out (SISO) communication. In SISO, mobile stations transmit on one antenna and base stations and/or relay stations receive on one antenna. FIGS. 1A and 1B illustrate the basic signal processing steps/blocks used at the transmitter and receiver for a conventional LTE SC-FDMA uplink.

The SC-FDMA transmitter 250 illustrated in FIG. 1A includes a signal processing path that includes an N-Point DFT 200, a Subcarrier mapper 202, an M-point IDFT 204, a cyclic prefix (CP) adder 206, a digital-to-analog converter and radio frequency (RF) radio 208, a transmit antenna 210.

The SC-FDMA receiver 260 illustrated in FIG. 1B includes a signal processing path that includes a receive antenna 212, an RF radio and analog-to-digital converter 214, a cyclic prefix remover 216, an M-point DFT 218, a Subcarrier de-mapper/equalizer 220, an N-point IDFT 222 and a detector 224.

SC-FDMA is a modulation and multiple access scheme introduced for the uplink of 3GPP Long Term Evolution (LTE) broadband wireless fourth generation (4G) air interface standards, and the like. SC-FDMA can be viewed as a discrete Fourier transform (DFT) pre-coded OFDMA scheme, or, it can be viewed as a single carrier (SC) multiple access scheme. There are several similarities in the overall transceiver processing of SC-FDMA and OFDMA. However, SC-FDMA is distinctly different from OFDMA because of the DFT pre-coding of the modulated symbols, and the corresponding IDFT of the demodulated symbols. Because of this pre-coding, the SC-FDMA sub-carriers are not independently modulated as in the case of the OFDMA sub-carriers. As a result, the Peak to Average Power Ratio (PAPR) of a SC-FDMA signal is lower than the PAPR of an OFDMA signal. Lower PAPR greatly benefits the mobile terminal in terms of transmit power efficiency.

The transmitter of an SC-FDMA system converts a binary input signal to a sequence of modulated subcarriers. To do so, it utilizes the signal processing blocks shown in FIG. 1A. Signal processing is repetitive in a few different time intervals. Resource assignment takes place in transmit time intervals (TTIs). In 3GPP LTE, a typical TTI is 0.5 ms. The TTI is further divided into time intervals referred to as blocks. A block is the time used to transmit all of subcarriers once.

At the input to the transmitter 250, a baseband modulator (not shown) transforms a binary input to a multilevel sequence of complex numbers $x_n$ in one of several possible modulation formats including binary phase shift keying (BPSK), quaternary PSK (QPSK), 16 level quadrature amplitude modulation (16-QAM) and 64-QAM. The system may adapt the modulation format, and thereby the transmission bit rate, to match the current channel conditions of each terminal.

The transmitter next groups the modulation symbols, $x_n$ into blocks each containing N symbols. The first step in modulating the SC-FDMA subcarriers is to perform an N-point discrete Fourier transform (DFT) with the N-point DFT 200, to produce a frequency domain representation $X_k$ of the input symbols. The Subcarrier mapper 202 then maps each of the N DFT outputs to one of M (M>N) orthogonal subcarriers that can be transmitted.

As in OFDMA, a typical value of M is 256 subcarriers and N=M/Q is an integer submultiple of M. Q is a bandwidth expansion factor of the symbol sequence. If all terminals transmit N symbols per block, the system can potentially handle Q simultaneous transmissions without co-channel interference. The result of the subcarrier mapping is a set $\tilde{X}_l$ ($l=0, 1, 2, \ldots, M-1$) of complex subcarrier amplitudes, where N of the amplitudes are non-zero. As in OFDMA, an M-point inverse DFT (IDFT), transforms the subcarrier amplitudes to a complex time domain signal $\tilde{x}_m$.

The CP adder 206 adds a set of symbols referred to as a cyclic prefix (CP) to the sequence of complex time domain symbols $\tilde{x}_m$ in order to provide a guard time to prevent inter-block interference (IBI) due to multipath propagation.

The DAC/RF block 208 then uses each $\tilde{x}_m$ (and the CP) to modulate a single frequency carrier and all the modulated symbols are transmitted sequentially via the transmit antenna 210.

The SC-FDMA receiver 260 receives SC-FDMA modulated symbols via the receive antenna 212, demodulates the received symbols and converts them from analog to digital with the RF/ADC 214 and removes the cyclic prefix with the CP remover 216. The M-point DFT 218 performs an M-point DFT once the CP has been removed and the frequency domain components in the output of the M-point DFT 218 are de-mapped (and in some cases equalized) by the subcarrier de-mapper 220. An N-point IDFT 222 performs an N-point IDFT on the de-mapped frequency domain components to generate a complex time domain signal from which the detector 224 extracts a binary output.

In some cases, the CP is a copy of the last part of the block, which is added to act as a guard time between successive blocks and to convert a discrete time linear convolution into a discrete time circular convolution. Thus transmitted data propagating through the channel can be modeled as a circular convolution between the channel impulse response and the transmitted data block, which in the frequency domain is a pointwise multiplication of the DFT frequency samples. Then, to remove the channel distortion, the DFT of the received signal can simply be divided by the DFT of the channel impulse response point-wise or a more complex frequency domain equalization technique may be used.

In the LTE DL, space frequency block coding (SFBC) is currently used for transmit diversity from the base station or repeater to the UE. However, as noted in 3GPP TSG RAN WG1 Meeting #47 R1-063178 "ST/SF Coding and Mapping Schemes of the SC-FDMA in E-UTRA Uplink" Riga, Latvia, Nov. 6-10, 2006, which is hereby incorporated by reference in its entirety, SFBC does not preserve the low PAPR property of SC-FDMA.

Space time block coding (STBC) has been proposed in 3GPP TSG RAN WG1 #47 R1-063179 "Performance evaluations of STBC/SFBC schemes in E-UTRA Uplink" Riga, Latvia, Nov. 6-10, 2006 and 3GPP TSG RAN WG1 Meeting #47bis R1-070174 "Performance Evaluation of SC-FDMA with STBC in E-UTRA Uplink" Sorrento, Italy, Jan. 15-19, 2007, which are hereby incorporated by reference in their entirety. However, STBC can be vulnerable to channel aging when UE is moving quickly. For example, LTE supports up to 350 km/h, with $f_c$=2 GHz, the maximum Doppler will be 648.2 Hz. This means that within 1 slot (i.e., 7 SC-FDMA symbols), the maximum channel phase change can be around 116°.

In addition, STBC requires an even number of SC-FDMA symbols, which is not guaranteed in LTE. For example, the uplink control channel PUCCH formats 2, 2a and 2b have an odd number of symbols.

Precoding vector hopping is a well known transmit diversity scheme in which each symbol is multiplied by a constant, which would not affect the low PAPR property of SC-FDMA.

Figure 2:
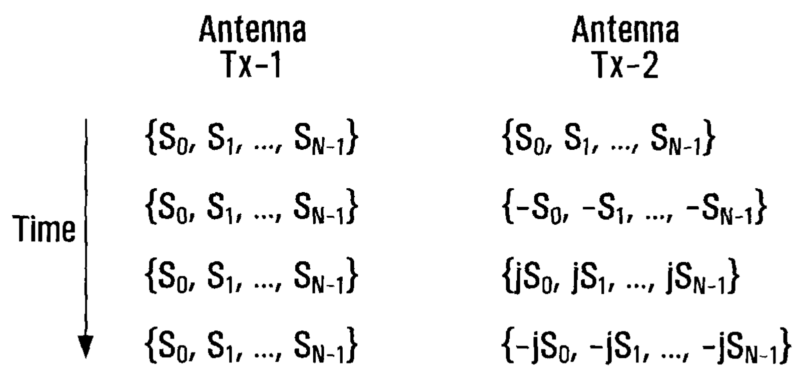
FIG. 2 is a listing of modulated data symbols that are to be transmitted by two antennas having had precoding vector hopping applied to the symbols for the second antenna.

FIG. 2 illustrates an example of how precoding vector hopping might be applied to SC-FDMA for transmit diversity of a two antenna UE. FIG. 2 shows a block of N modulation symbols represented by $\{S_0, S_1, \ldots S_{N-1}\}$ hopping through a sequence of precoding vectors $[1,1]^T$, $[1,-1]^T$, $[1,j]^T$ and $[1,-j]^T$ over four successive symbol periods. It is noted that the four precoding vectors correspond to the codebook vectors defined for the LTE downlink. That is, the elements of the precoding vectors are equal to either ±1 or ±j. It should also be noted that $\{S_0, S_1, S_{N-1}\}$ carries different modulated data at different times.

As can be seen in FIG. 2, precoding vector hopping involves hopping over different vectors to achieve spatial diversity, which means that the original signal has to be forward error correction (FEC) coded in the time direction (redundancy) and the transmitted symbols need to hop through a set of vectors to achieve the diversity.

This hopping requirement can potentially cause serious problems for the UL control channel PUCCH, because it is not FEC coded across time, which means that instead of diversity, destructive combining can occur from one SC-FDMA symbol to another, which can result in unreliable performance.

Cyclic shift delay diversity (CDD) has been contemplated as a transmit diversity technique for OFDMA. However, it is not typically used as a means of transmit diversity due to its typical underperformance relative to SFBC for OFDMA applications.

In CDD, a cyclic shift delay in the time domain, which manifests as a phase angle change in the frequency domain, is applied to a symbol in the time domain prior to transmission. In OFDMA applications, CDD is implemented after the OFDM modulation is done, which typically includes forward error correction (FEC) coding, interleaving, modulation, and an M-point IDFT. After the IDFT, the signal is split in $N_A$ antenna branches. The cyclic shift of the first antenna is set to zero, while in the other branches the signal is cyclically shifted by an antenna specific cyclic shift $\delta_n$, n=1, . . . , $N_A-1$. The equivalent representation in the frequency domain, which is called Phase Diversity (PD), can directly be calculated from the M-point IDFT and corresponds to:

$$s(l) = \frac{1}{\sqrt{M}} \sum_{k=0}^{M-1} S(k) \cdot e^{j\frac{2\pi}{M}kl}, \quad \text{(Eq. 1)}$$

$$s(l-\delta_n) = \frac{1}{\sqrt{M}} \sum_{k=0}^{M-1} e^{-j\frac{2\pi}{M}k\delta_n} \cdot S(k) \cdot e^{j\frac{2\pi}{M}kl}, \quad \text{(Eq. 2)}$$

Where l, k, s(l), and S(k) denote the discrete time, the discrete frequency, and the complex-valued signals in time domain and frequency domain, respectively and $l-\delta_n$ is calculated modulo M.

Compared to SFBC, STBC and vector hopping, CDD appears to be more suitable to SC-FDMA, as used in the LTE uplink, because CDD preserves the PAPR property of a transmitted sequence (unlike SFBC), can be applied to a sub-channel consisting of an even or an odd number of SC-FDMA symbols (unlike STBC), it is not sensitive to the speed of movement of a UE (unlike STBC), and diversity gain can be achieved in one SC-FDMA symbol (unlike precoding vector hopping, which requires hopping through multiple symbols to obtain diversity performance).

However, CDD can potentially introduce severe frequency selective fading in SC-FDMA, as some sub-carrier combinations may combine constructively, while others combine destructively causing fading, which can degrade SC-FDMA performance. The severity of the degradation is generally dependent on how the respective channel between each transmit antenna and each receive antenna at, for example, a base station or a repeater, affects the transmitted symbols, thereby affecting whether the combination of transmitted signals is destructive or constructive.

In accordance with an aspect of the present application, this potential frequency fading issue associated CDD can potentially be mitigated by introducing as many channel combinations as possible within a "diversity cycle", i.e., within one transmitted SC-FDMA symbol. As noted above, introducing a cyclic shift delay in the time domain translates to a phase angle shift in the frequency domain, which means that if a cyclic shift delay is applied to the time domain SC-FDMA symbol, some phase angle change will be introduced in the sub-carrier components of the transmitted SC-FDMA symbol.

Figure 3:
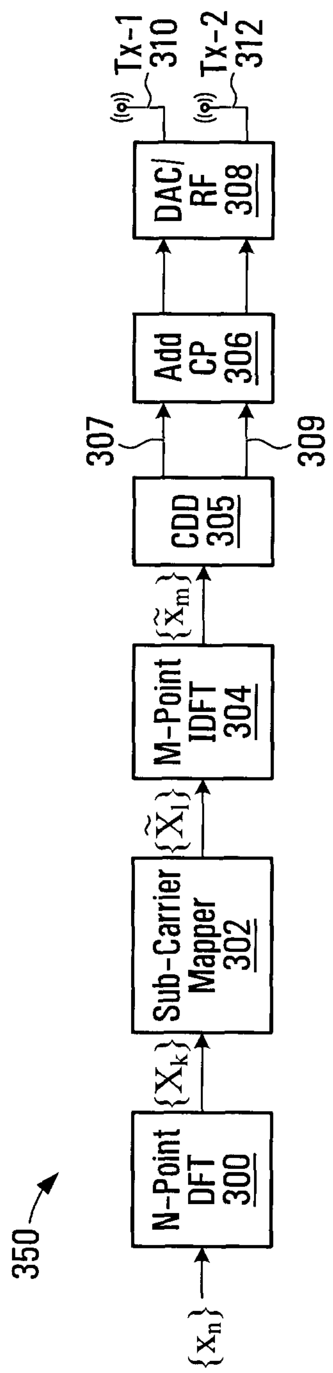
FIG. 3 is a block diagram of a SC-FDMA transmitter that utilizes cyclic shift delay diversity (CDD) for uplink transmission diversity on two antennas.

FIG. 3 is a block diagram of an SC-FDMA transmitter in accordance with an embodiment of the present application in which CDD is utilized to provide transmit diversity for a dual antenna SC-FDMA transmitter 350.

The dual antenna SC-FDMA transmitter 350 illustrated in FIG. 3 includes a signal processing path that includes an N-point DFT 300, a Subcarrier mapper 302, an M-point IDFT 304 (M>N), a cyclic shift delay diversity (CDD) block 305, a cyclic prefix adder 306, a DAC/RF block 308 and two transmit antennas 310, 312. The N-point DFT 300, Subcarrier mapper 302, M-point IDFT 304 (M>N) operate in the same manner as the N-point DFT 200, Subcarrier mapper 202, an M-point IDFT 204 (M>N) described above with reference to FIG. 1A. The CDD block 305 passes a reference version 307 of the complex time domain signal $\tilde{x}_m$ to the CP adder 306 for the first transmit antenna 310 and also produces a cyclic shift delayed version 309 of the complex time domain signal $\tilde{x}_m$ that it passes to the CP adder 306 for the second transmit antenna 312.

Figure 4:
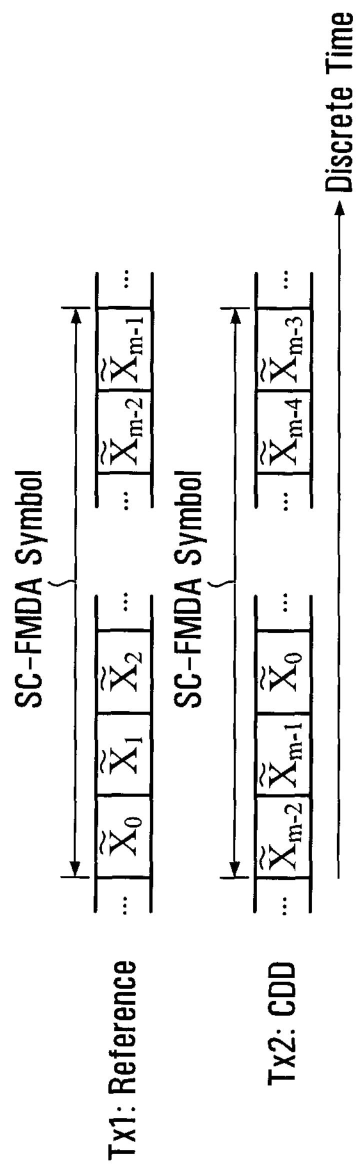
FIG. 4 is a time domain representation of SC-FDMA symbols for two antennas with cyclic shift delay applied to the SC-FDMA symbol of one of the antennas.

FIG. 4 illustrates an example of how the discrete time components of the SC-FDMA symbols that are generated for the first and second antennas of a dual antenna SC-FDMA transmitter are affected by CDD. In FIG. 4 it is assumed that SC-FDMA symbol for the second antenna is cyclic shift delayed by two discrete time transmission intervals.

By adding a cyclic shift delay to the version of the complex time domain signal $\tilde{x}_m$ that is eventually driven to the second antenna, the SC-FDMA symbols transmitted by the second antenna will have a linearly increasing phase angle change in the frequency direction. This is indicated by the $$e^{-j\frac{2\pi}{M}k\delta_n}$$

term in Eq. 2 (k is discrete frequency). Accordingly, if the cyclic shift delay $\delta_n$ is set to ¼ of the symbol length M, i.e.

$$\delta_n = \frac{M}{4},$$

then the above term is equal to $$e^{-j\frac{\pi}{2}k},$$

which represents a 90° increase in phase angle change across the discrete frequency sub-band. Similarly, if the cyclic shift delay $\delta_n$ is set to ½ of the symbol length M, i.e.

$$\delta_n = \frac{M}{2},$$

then a 180° increase in phase angle change across the discrete frequency sub-band. As such, if the cyclic shift delay is set to ¼ of the symbol length M, then while the first antenna transmits a sequence of modulated data symbols corresponding to $$\{x_0, x_1, x_2, x_3, \ldots, x_{N-1}\}, \quad (1)$$

where $x_0, x_1, x_2, x_3, \ldots, x_{N-1}$ correspond to the N modulated data symbols $\{x_n\}$, the second antenna transmits a sequence of modulated data symbols corresponding to $$\{x_0, -jx_1, -x_2, jx_3, \ldots, jx_{N-1}\}. \quad (2)$$

That is, there is an increase of $$-\frac{\pi}{2}$$

or −90° change in phase angle between the terms of sequence (2), i.e. the linear change in phase angle across frequency follows the pattern $$\left\{0, e^{-\frac{j\pi}{2}} = -j, e^{-j\pi} = -1, e^{-\frac{j3\pi}{2}} = j, \ldots, e^{-\frac{j(N-1)\pi}{2}} = -j\right\}.$$

Similarly, if the cyclic shift delay were set to −M/4 rather than M/4, then the resulting linear increase in phase angle across frequency would be $$\frac{\pi}{2}$$

or 90°, and the second antenna would transmit a sequence of modulated data symbols corresponding to $$\{x_0, jx_1, -x_2, -jx_3, \ldots, -jx_{N-1}\}. \quad (3)$$

Likewise, if the cyclic shift delay $\gamma_n$ is set to ½ of the symbol length M, i.e.

$$\delta_n = \frac{M}{2},$$

then while the first antenna is transmitting sequence (1), then the second antenna would be transmitting the sequence $$\{x_0, -x_1, x_2, -jx_3, \ldots, -x_{N-1}\}. \quad (4)$$

It is observed that setting the cyclic shift delay to ±¼ of the symbol length results in the elements of the sequences transmitted by the two antennas having elements composed of {1,j}, which means that reconstruction of the effective channel at a receiver may be relatively easy, since no complex number are involved.

Furthermore, it is noted that assuming a flat channel, only ¼ of the subcarriers have the same combination relation in sequences (2) and (3), whereas ½ of the subcarriers in sequence (4) have the same combination relation.

It is noted that the CDD scheme based on the proposed cyclic delay selection described above can be viewed from a precoding matrix hopping point of view. In the LTE standard, a precoding codebook has been defined in the downlink. It consists of $[1,1]^T$, $[1,-1]^T$, $[1,j]^T$ and $[1,-j]^T$.

If we do precoding matrix hopping in the frequency direction for the sub-carrier components of the transmitted SC-FDMA symbol, and in the sequence such that the phase angle change of the sub-carrier components of the SC-FDMA symbol for the second antenna linearly increases using the sequence of:

$$[1,1]^T, [1,-j]^T, [1,-1]^T \text{ and } [1,j]^T \quad (5)$$

or $$[1,1]^T, [1,j]^T, [1,-1]^T \text{ and } [1,-j]^T, \quad (6)$$

then the low PAPR property can be preserved and only ¼ of the sub-carriers will have the same combination relation. Furthermore, because we have only used the elements {1,j} to precode the SC-FDMA symbols, it is potentially easy to reconstruct the effective channel at a receiver.

Using the PAPR preserving precoding matrix hopping approach described above in a two antenna SC-FDMA transmitter, the first antenna is precoded with "1" only, such that the first antenna's block of modulated signals is equal to $$\{x_0, x_1, x_2, x_3, \ldots, x_{N-1}\}, \quad (7)$$

while the second antenna's block of modulated signals is determined by either hopping through the sequence (5) above to produce $$\{x_0, -jx_1, -x_2, jx_3, \ldots, jx_{N-1}\}, \quad (8)$$

or by hopping through the sequence (6) above to produce $$\{x_0, jx_1, -x_2, -jx_3, \ldots, -jx_{N-1}\}. \quad (9)$$

It is noted that sequences (8) and (9) produced by precoding matrix hopping in the frequency direction of the LTE precoding codebook defined for the DL are the same as the sequences (2) and (3) resulting from the cyclic shift delay of ¼ of the symbol length, and that the resulting sequences include all of the coding elements of the codebook.

The above sequences (2), (3), (8), (9) preserve the low PAPR property and introduces as many channel combinations as possible within a single SC-FDMA symbol for the coding element {1,j} provided by the codebook defined for the LTE downlink.

The use of {1,j} as the coding elements in the two sequences provided above means that a linear increase of 90° of phase angle change is introduced between the modulated sub-carriers of the SC-FDMA symbol for the second antenna, which is why only ¼ of the sub-carriers have the same combination relation, since it takes four 90° phase angle increases to go full circle through the code before it repeats. The linear increase in phase angle provided by the two specific sequences identified above preserves the low PAPR property of SC-FDMA.

While the foregoing precoding matrix hopping scheme has been described in the context of a two antenna transmitter, it is possible to extend the concept to a four antenna transmitter using the following sequence:

$$[1,1,1,1]^T, [1,-j,j,-1]^T, [1,-1,-1,1]^T, [1,j,-j,-1]^T, \quad (10)$$

which results in the following precoded SC-FDMA symbols for the four antennas:

$$\{x_0, x_1, x_2, x_3, \ldots, x_{N-1}\}, \quad (11)$$

$$\{x_0, -jx_1, -1x_2, jx_3, \ldots, jx_{N-1}\}, \quad (12)$$

$$\{x_0, jx_1, -1x_2, -jx_3, \ldots, -jx_{N-1}\}, \text{ and} \quad (13)$$

$$\{(1, -1, +1, -1, \ldots, -1\}. \quad (14)$$

It is noted that sequences (12), (13) and (14) can be realized by introducing cyclic shift delays of $$\delta_n = \left(0, \frac{M}{4}, -\frac{M}{4}, \text{ and } \frac{M}{2}\right\}$$

for the four antennas respectively, where M is the symbol length.

Another diversity scheme in accordance with an embodiment of the present application is referred to herein as sub-band based transmit diversity (SBTD). In SBTD, the contiguous bandwidth of a UE having N_Tx transmit antennas (N_Tx≥2) is divided into N_Tx sub-bands, with each of the N_Tx transmit antennas being assigned to a respective one of the N_Tx sub-bands, wherein each transmit antenna transmits 1/N_Tx of data symbols for the UE in its respective sub-band.

Figure 5A:
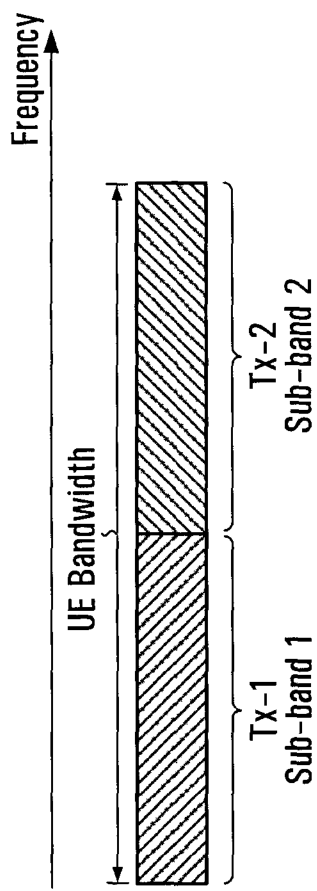
FIG. 5A is a bandwidth allocation chart illustrating an example of how sub-band transmission diversity might be implemented for a UE having two transmit antennas.
Figure 10:
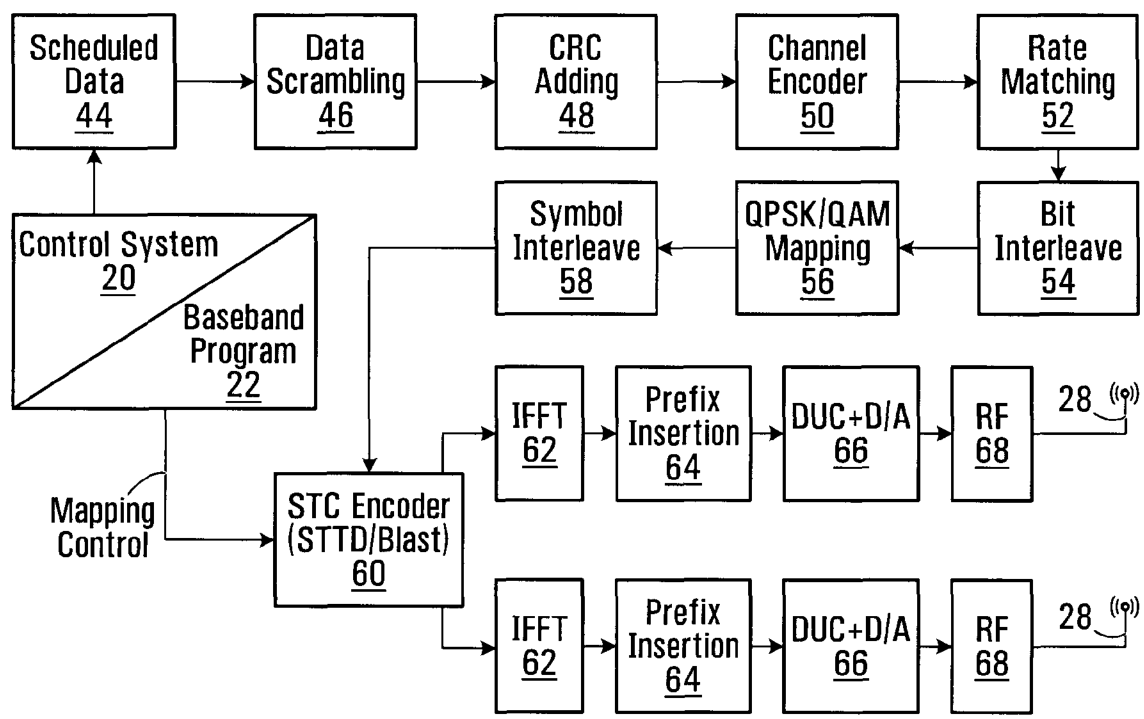
FIG. 10 is a block diagram of a logical breakdown of an example OFDM transmitter architecture that might be used to implement some embodiments of the present application.

FIG. 5(*a*) is a bandwidth allocation chart illustrating an example of how SBTD might be implemented for a UE having two transmit antennas. In FIG. 10(*a*) the bandwidth of a UE is divided into two equal contiguous sub-bands sub-band 1 and sub-band 2, respectively, allocated to the UE's two transmit antennas respectively.

In LTE the minimum pilot sequence is by definition one resource block, as a single resource block is the minimum resource that can be allocated. In some embodiments, if the size of the respective sub-bands is smaller than one resource block, a plurality of the sub-bands may use the same resource block bandwidth in code division multiple access (CDMA).

In some embodiments, SBTD is used for data transmission on the physical uplink shared channel.

Because SC-FDMA signals are still being transmitted within contiguous sub-bands of contiguous sub-carriers in SBTD, SBTD preserves the low PAPR property of SC-FDMA and does not introduce frequency selectivity into SC-FDMA processing. Furthermore, dividing the transmitted data between separate sub-bands and on separate antennas can potentially reduce the complexity of the transmitter circuitry, as the size of the DFT (per antenna) may be reduced compared to the DFT required in non-SBTD diversity schemes. For example, if we assume that there are 4 resource blocks required for transmission on a dual antenna SC-FDMA transmitter that utilizes SBTD in accordance with an embodiment of the present application for transmission diversity, might be possible to assign two of the resource blocks to a first one of the transmit antennas operating in a first sub-band, and assign the other two resource blocks to the second transmit antenna operating in a second sub-band. Since a respective N-point DFT capable of handling two resource blocks could be used for each antenna in this SBTD scenario, the total complexity of the DFT circuitry is likely lower than non-SBTD scenarios in which a single DFT capable of handling four resource blocks would likely be required.

Figure 5B:
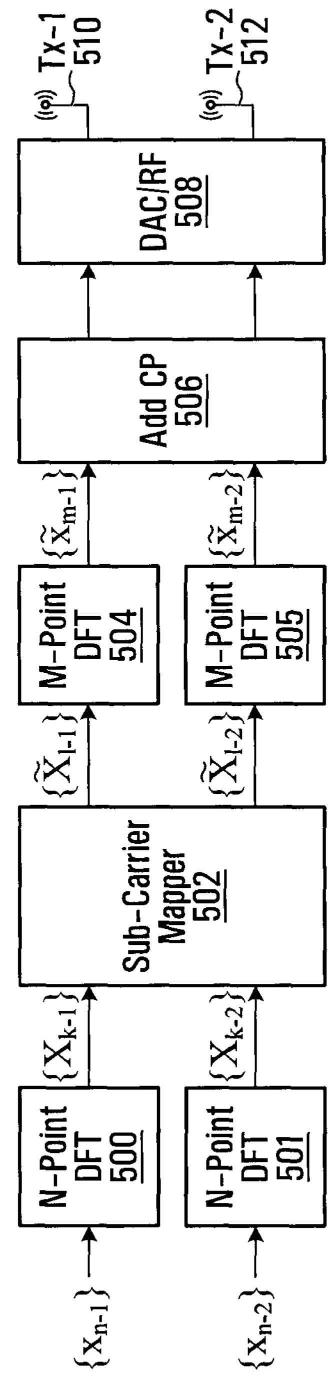
FIG. 5B is a block diagram of a SC-FDMA transmitter that utilizes SBTD for transmission diversity on two transmit antennas.

FIG. 5B is a block diagram of a dual antenna SC-FDMA transmitter in accordance with an embodiment of the present application in which SBTD is utilized to provide transmit diversity for the dual antenna SC-FDMA transmitter.

The dual antenna SC-FDMA transmitter illustrated in FIG. 5B includes two parallel signal processing paths that include respective N-point DFTs 500 and 501, a common Subcarrier mapper 502, respective M-point IDFTs 504 and 505 (M>N), a common cyclic prefix (CP) adder 506, a common DAC/RF block 508 and respective transmit antennas 510 and 512.

The N-point DFTs 500 and 501 each operate in the same manner as the N-point DFT 200 shown in FIG. 1A and the N-point DFT 300 shown in FIG. 3, each performing an N-point DFT N grouped modulation symbols $x_{n\_1}$ and $x_{n\_2}$, respectively to produce frequency domain representations $X_{k\_1}$ and $X_{k\_2}$ respectively. The Subcarrier mapper 502 then maps each of the N DFT outputs $X_{hdk\_1}$ from the first N-point DFT 500 to a respective subcarrier in the sub-band assigned to the first antenna 510 and maps each of the N DFT outputs $X_{k\_2}$ from the second N-point DFT 501 to a respective sub-carrier in the sub-band assigned to the second antenna 512.

The result of the subcarrier mapping is two sets $\tilde{X}_{l\_1}$ and $\tilde{X}_{l\_2}$ (l=0, 1, 2, . . . , M−1) of complex subcarrier amplitudes, where N of the amplitudes are non-zero in each set of M amplitudes. It has been assumed that the UE bandwidth has been divided equally between the two sub-bands assigned to the respective antennas and the UE bandwidth is equal to 2M. The M-point IDFTs 504 and 505 perform respective M-point IDFTs on their M respective inputs to transform the subcarrier amplitudes $\tilde{X}_{l\_1}$ and $\tilde{X}_{l\_2}$, respectively, into two complex time domain signals $\tilde{x}_{m\_1}$ and $\tilde{x}_{m\_2}$ respectively.

The CP adder 506 adds a cyclic prefix (CP) to the complex time domain signals $\tilde{x}_{m\_1}$ and $\tilde{x}_{m\_2}$. In some embodiments, the CP added to each complex time domain signal is the same. In some embodiments, a different CP is added to each complex time domain signal.

The DAC/RF block 208 uses each $\tilde{x}_{m\_1}$ (and the CP) to modulate a single frequency carrier and all the modulated symbols for the first signal processing path are transmitted sequentially via the first transmit antenna 510 in the sub-band assigned to the first antenna. The DAC/RF block 208 also uses each $\tilde{x}_{m\_2}$ (and the CP) to modulate a single frequency carrier and all the modulated symbols for the second signal processing path are transmitted sequentially via the second transmit antenna 512 in the sub-band assigned to the second antenna.

While the Subcarrier mapper 502, CP adder 506 and DAC/RF block 508 are shown as being common to both signal processing paths in the embodiment illustrated in FIG. 5B, in some embodiments, the functionality of those blocks may implemented by separate functional blocks/circuits for each signal processing path.

While the SC-FDMA transmitter shown in FIG. 5B has two transmit antennas, more generally, SBTD capable SC-FDMA transmitters in accordance with the present application may have any number of transmit antennas. In some embodiments, each antenna has its own signal processing path.

In some embodiments, the UE bandwidth is divided unevenly between the multiple transmit antennas.

As noted above, SC-FDMA have been adopted in the LTE uplink largely due to its inherent low PAPR properties, which can potentially increase the coverage of power restricted/limited UE relative to, for example, OFDMA. However, when a UE has enough power headroom then the restrictions placed on conventional SC-FDMA, as used in the LTE uplink, are not necessary, as low PAPR is not an issue for UEs with enough power headroom.

In the LTE DL, a UE can be allocated several sub-bands to exploit frequency domain multiple upfades. This also makes frequency domain diversity possible. However, the current 3GPP LTE standard limits UL resource grant to one sub-band only per UE. This limits the UL performance in two ways, namely, a UE will not be able to exploit multiple frequency domain up fades, nor is it able to exploit frequency diversity, which potentially limits the UL link level thoughput and reliability.

Current LTE standard also does not support UL multi-antenna transmission. As noted above, In LTE-Advanced, this will change. The current restriction on multi-sub-band UL allocation is sometimes related to the restriction on multi-antenna UL transmission. For example, to preserve low PAPR, in the current LTE standard only one codeword is allowed in one sub-band, regardless how wide the sub-band is.

Some aspects of the present application may mitigate these two restrictions when it is possible for a UE to do so, so as to potentially improve LTE UL performance.

UE UL Adaptive Sub-channelization

The current LTE standard provides a mechanism by which an evolved Node B (eNB) is aware of the power headroom of a UE. In accordance with an embodiment of the present application, when a UE has enough power headroom, the eNB may assign multiple sub-bands to the specific UE for uplink communication. The UE, having been assigned multiple sub-bands may now transmit on the multiple sub-bands to exploit multiple fading peaks in the frequency domain (closed loop) and frequency diversity for potentially improved uplink link level performance (open loop).

UE UL Adaptive Closed-loop Rank and Codeword Adaptation

Another embodiment of the present application provides UL adaptive closed loop rank/codeword adaptation based on UE power headroom. Specifically, when a UE has enough headroom, multi-layer and multi-codeword MIMO transmission can be employed to improve link level throughput/reliability. In the current LTE standard, a UE is limited to the use of a single transmit antenna in the UL, and is limited to the use of a single codeword in a single sub-band. This is because multi-layer/multi-rank transmission and multi-codeword rank-1 transmission affect the low PAPR property of SC-FDMA. The use of only a single code-word in a sub-band potentially limits the UE's ability to "tune" to the communication channel. For example, if three resource blocks are assigned and a different precoder vector is assigned to each resource block then the variation in precoder vector along the sub-band bandwidth might affect the PAPR, but it also may allow the UE to exploit multiple fading peaks. In accordance with this embodiment of the present application, when a UE has insufficient power headroom, single codeword rank-1 transmission can be used in the uplink, which is the default transmission mode for the UL in the LTE standard. However, when the UE has sufficient power headroom, the eNB can schedule higher rank/layer transmission, for example rank-2 transmission, or multi-codeword rank-1 transmission, based on channel strength.

UL CL Multi-sub-band Frequency Dependent Scheduling with Low PAPR

In accordance with another embodiment of the present invention, for circumstances in which the low PAPR property of SC-FDMA may need to be preserved, antenna sub-grouping can be used to enable multi-sub-band frequency dependent scheduling.

For UE capable of MIMO transmission, the UE can either use single sub-band MIMO transmission, in accordance with the foregoing embodiments directed to multi-antenna UL transmission, or, in accordance with this embodiment of the present application the transmit antennas of the UE can be divided into sub-groups, with each sub-group transmitting in a respective sub-band.

This sub-grouping of antennas allows the system to exploit multiple frequency domain peak with respective precoding codewords, while preserving the low PAPR properties of SC-FDMA. For example, with two transmit antenna, each antenna can transmit at its respective peak with frequency selective scheduling (FSS). Although the gain from this approach may be more significant when the transmit antennas are uncorrelated, meaning that their frequency fading peaks are independent of one another.

UL Multi-antenna RACH with Low PAPR

In the LTE DL synchronization channel (SCH), time domain vector hopping is adopted due to its simplicity and performance.

Time domain precoder vector hopping preserves the low PAPR property of a transmitted sequence because each symbol is merely multiplied by a constant. As noted earlier, time domain precoder vector hopping requires hopping over different vectors to achieve spatial diversity. This can cause problems if the transmitted signal is not forward error correction (FEC) coded in the time domain, as destructive combining can occur from one SC-FDMA symbol to another.

However, the LTE UL random access channel (RACH) is FEC coded (convolutional code) and hence, in accordance with an embodiment of the present application time domain vector hopping is used for multi-antenna RACH transmission. For example, for two antenna transmission, the vectors used for time domain vector hopping could be $\{1,1\}$, $\{1,-1\}$, {1,j} and {1,−j}. An example of sequences of symbols that may be transmitted for two antennas using these exemplary vectors are shown in FIG. 2.

For four antenna transmission, the vectors can be any combination made of the elements {1} and {j}. However, it is noted that changing half of the elements between vectors can potentially provide for faster detection. That is {1,1,1,1}, {1,−1,1,−1}, . . . might be detected faster than if only one of the four elements changed between vectors.

Wireless System Overview

Figure 6:
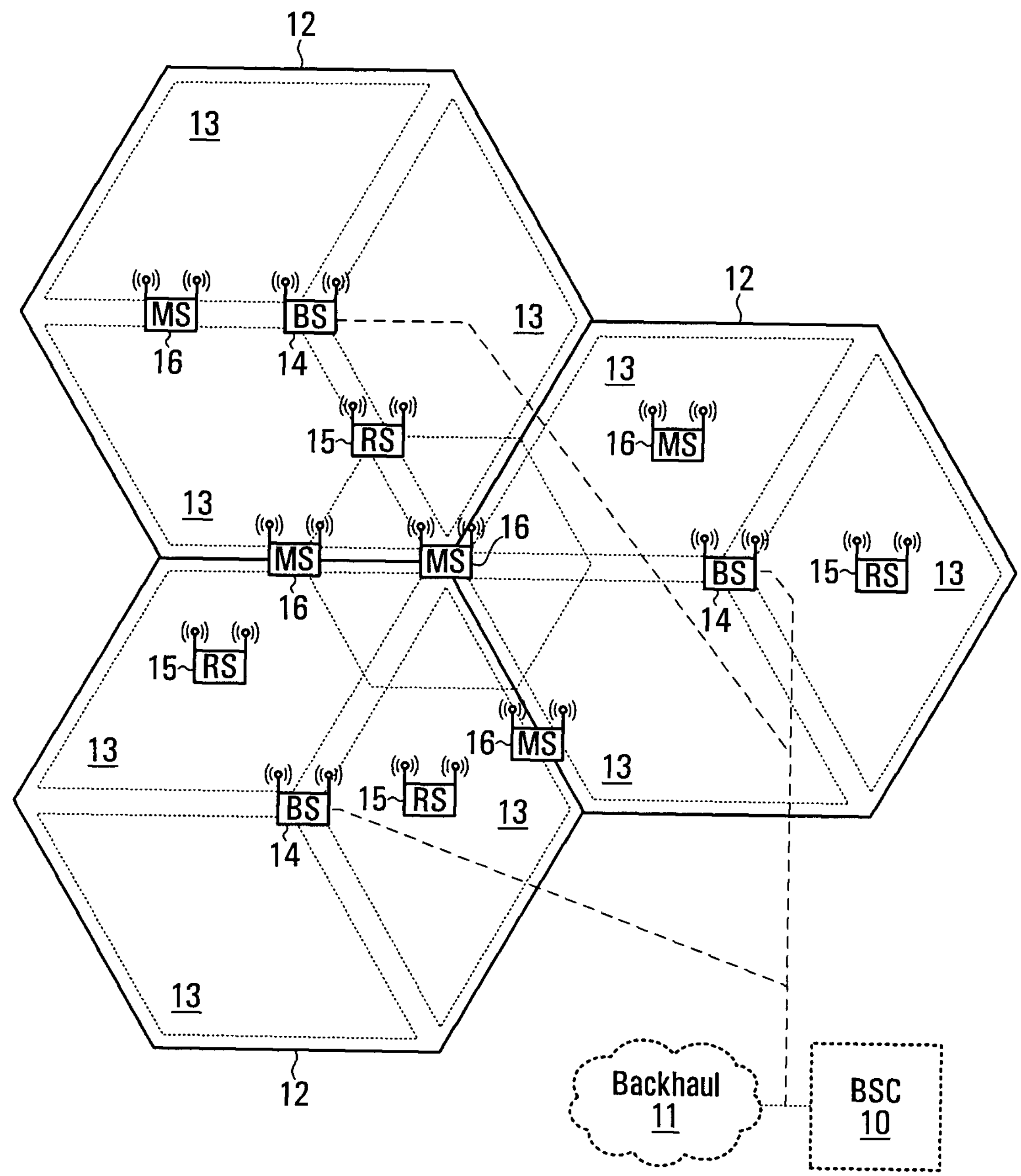
FIG. 6 is a block diagram of a cellular communication system.

Referring to the drawings, FIG. 6 shows a base station controller (BSC) 10 which controls wireless communications within multiple cells 12, which cells are served by corresponding base stations (BS) 14. In some configurations, each cell is further divided into multiple sectors 13 or zones (not shown). In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications. In some configurations, relay stations 15 may assist in communications between base stations 14 and wireless terminals 16. Wireless terminals 16 can be handed off 18 from any cell 12, sector 13, zone (not shown), base station 14 or relay 15 to an other cell 12, sector 13, zone (not shown), base station 14 or relay 15. In some configurations, base stations 14 communicate with each and with another network (such as a core network or the internet, both not shown) over a backhaul network 11. In some configurations, a base station controller 10 is not needed.

Figure 7:
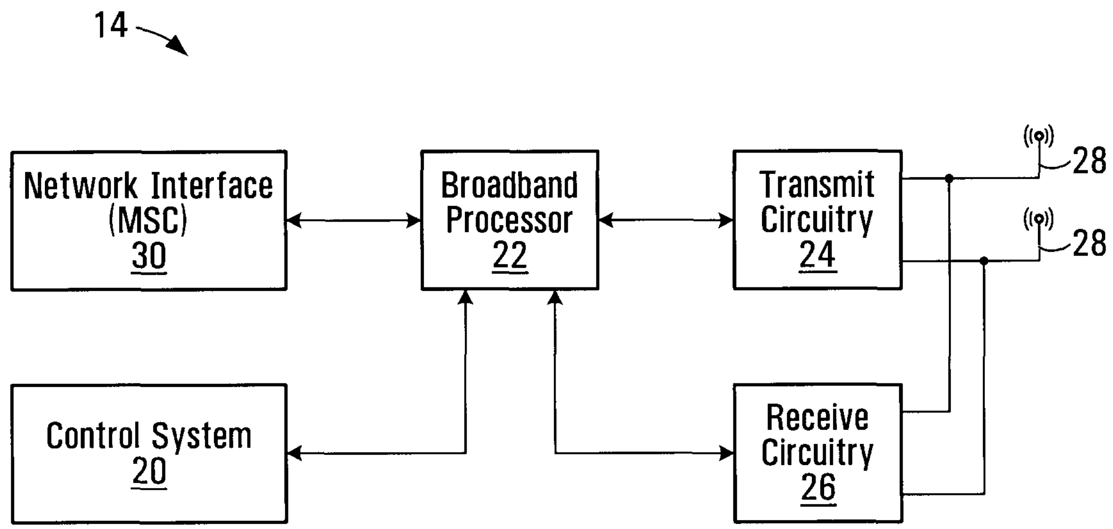
FIG. 7 is a block diagram of an example base station that might be used to implement some embodiments of the present application.

With reference to FIG. 7, an example of a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 8) and relay stations 15 (illustrated in FIG. 9). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 8:
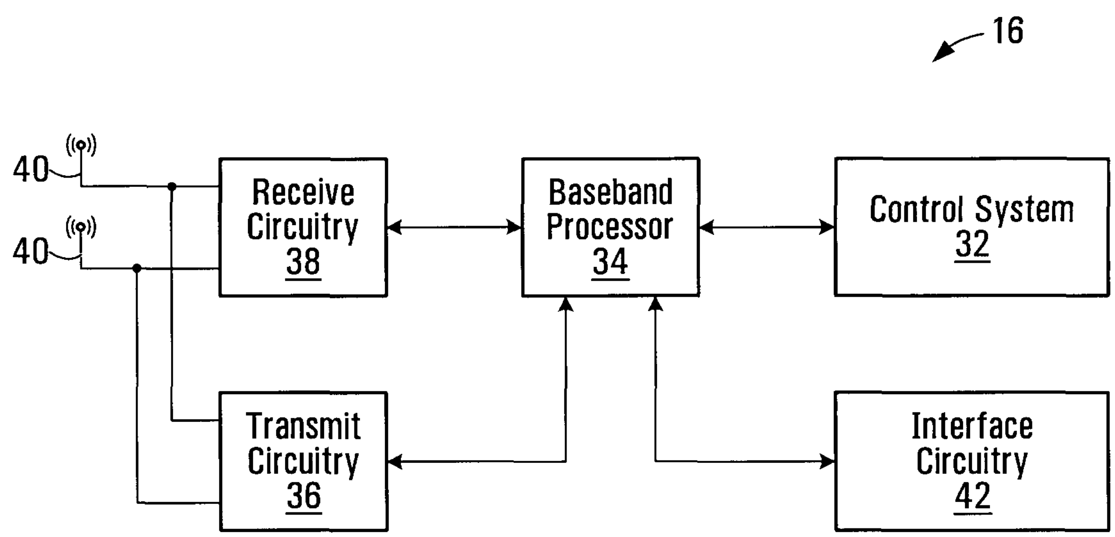
FIG. 8 is a block diagram of an example wireless terminal that might be used to implement some embodiments of the present application.

With reference to FIG. 8, an example of a mobile terminal 16 is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is typically used for at least downlink transmission from the base stations 14 to the mobile terminals 16. Each base station 14 is equipped with "n" transmit antennas 28 (n>=1), and each mobile terminal 16 is equipped with "m" receive antennas 40 (m>=1). Notably, the respective antennas can be used for reception and transmission using appropriate duplexers or switches and are so labeled only for clarity.

When relay stations 15 are used, OFDM is preferably used for downlink transmission from the base stations 14 to the relays 15 and from relay stations 15 to the mobile terminals 16.

Figure 9:
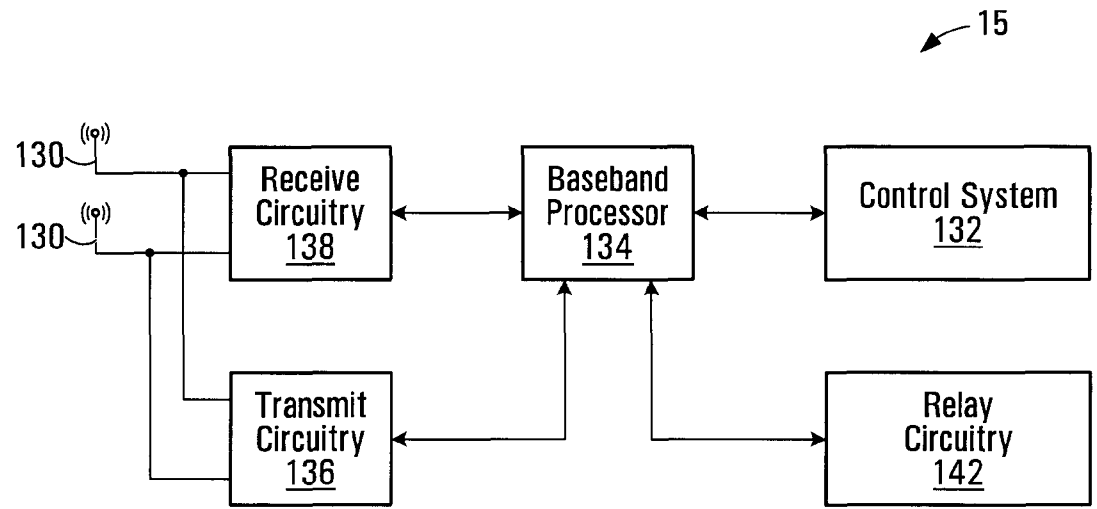
FIG. 9 is a block diagram of an example relay station that might be used to implement some embodiments of the present application.

With reference to FIG. 9, an example of a relay station 15 is illustrated. Similarly to the base station 14, and the mobile terminal 16, the relay station 15 will include a control system 132, a baseband processor 134, transmit circuitry 136, receive circuitry 138, multiple antennas 130, and relay circuitry 142. The relay circuitry 142 enables the relay 14 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

With reference to FIG. 10, a logical OFDM transmission architecture will be described. Initially, the base station controller 10 will send data to be transmitted to various mobile terminals 16 to the base station 14, either directly or with the assistance of a relay station 15. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 10 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 11:
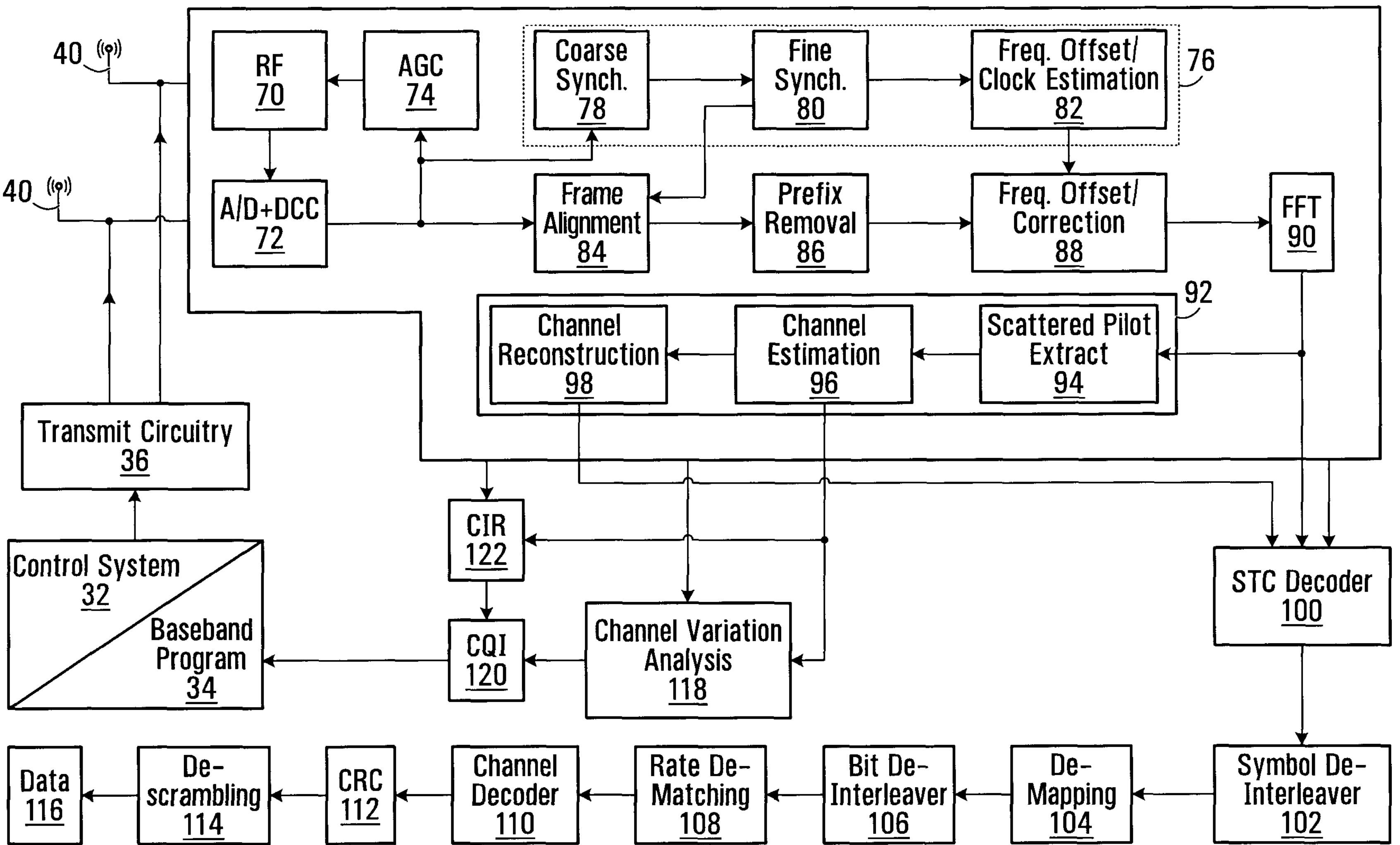
FIG. 11 is a block diagram of a logical breakdown of an example OFDM receiver architecture that might be used to implement some embodiments of the present application.

Reference is now made to FIG. 11 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (AID) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum 10 of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 11, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 6 to 11 provide one specific example of a communication system that could be used to implement embodiments of the application. It is to be understood that embodiments of the application can be implemented with communications systems having architectures that are different than the specific example, but that operate in a manner consistent with the implementation of the embodiments as described herein.

Numerous modifications and variations of the present invention are possible in light of the above teachings. It is therefore to be understood that within the scope of the appended claims, the invention may be practiced otherwise than as specifically described herein.

The invention claimed is:

1. A method for single carrier frequency division multiple access (SC-FDMA) uplink transmission diversity in a wireless communication device having $N_A$ antennas, $N_A$=2, the method comprising:

for a group of N modulated data symbols:

performing an N-point discrete Fourier transform (DFT) on the N modulated data symbols to generate a set of N frequency domain components of the N modulated data symbols;

mapping the N frequency domain components of the N modulated data symbols to N sub-carriers in a sub-band M sub-carriers wide (M>N) to generate a set of M complex subcarrier amplitudes;

performing an M-point inverse discrete Fourier transform (IDFT) on the set of M complex sub-carrier amplitudes to generate a reference sequence of M discrete time domain values;

generating a cyclic shift delayed version of the reference sequence of M discrete time domain values that is cycle shifted by M/4 relative to the reference sequence;

transmitting an SC-FDMA signal on one of the $N_A$ antennas using the reference sequence of discrete time domain values; and for the other antenna, transmitting a respective SC-FDMA signal generated using the cyclic shift delayed version of the reference sequence of M discrete time domain values.

2. A method for single carrier frequency division multiple access (SC-FDMA) uplink transmission diversity in a wireless communication device having $N_A$ antennas, $N_A=4$, the method comprising:

for a group of N modulated data symbols:

performing an N-point discrete Fourier transform (DFT) on the N modulated data symbols to generate a set of N frequency domain components of the N modulated data symbols;

mapping the N frequency domain components of the N modulated data symbols to N sub-carriers in a sub-band M sub-carriers wide (M>N) to generate a set of M complex subcarrier amplitudes;

performing an M-point inverse discrete Fourier transform (IDFT) on the set of M complex sub-carrier amplitudes to generate a reference sequence of M discrete time domain values;

generating three cyclic shift delayed versions of the reference sequence of M discrete time domain values that are cycle shifted by M/4, −M/4 and M/2 relative to the reference sequence, respectively;

transmitting an SC-FDMA signal on a first one of the $N_A$ antennas using the reference sequence of discrete time domain values; and for each one of the other $N_A$ antenna, transmitting a respective SC-FDMA signal generated using a respective one of the three cyclic shift delayed versions of the reference sequence of M discrete time domain values.

3. A wireless transmitter comprising:

a discrete Fourier transformer configured to perform an N-point discrete Fourier transform (DFT) on N modulated data symbols to generate a set of N frequency domain components of the N modulated data symbols;

a sub-carrier mapper configured to map the N frequency domain components of the N modulated data symbols to N sub-carriers in a sub-band M sub-carriers wide (M>N) to generate a set of M complex subcarrier amplitudes;

an inverse discrete Fourier transformer configured to perform an M-point inverse discrete Fourier transform (IDFT) on the set of M complex sub-carrier amplitudes to generate a reference sequence of M discrete time domain values;

a cyclic shift delayer configured to generate a cyclic shift delayed version of the reference sequence of M discrete time domain values that is cycle shifted by M/4 relative to the reference sequence; and an RF transmitter configured to:

for a first antenna, modulate the M sub-carriers of the sub-band sequentially using the reference sequence of discrete time domain values to transmit an SC-FDMA signal on the first antenna; and for a second antenna, modulate the M sub-carriers of the sub-band sequentially using the cyclic shift delayed version of the reference sequence of M discrete time domain values to transmit an SC-FDMA signal on the second antenna.

4. A wireless transmitter comprising:

a discrete Fourier transformer configured to perform an N-point discrete Fourier transform (DFT) on N modulated data symbols to generate a set of N frequency domain components of the N modulated data symbols;

a sub-carrier mapper configured to map the N frequency domain components of the N modulated data symbols to N sub-carriers in a sub-band M sub-carriers wide (M>N) to generate a set of M complex subcarrier amplitudes;

an inverse discrete Fourier transformer configured to perform an M-point inverse discrete Fourier transform (IDFT) on the set of M complex sub-carrier amplitudes to generate a reference sequence of M discrete time domain values;

a cyclic shift delayer configured to generate three cyclic shift delayed versions of the reference sequence of M discrete time domain values that are cycle shifted by M/4, −M/4 and M/2 relative to the reference sequence, respectively; and an RF transmitter configured to:

for a first antenna, modulate the M sub-carriers of the sub-band sequentially using the reference sequence of discrete time domain values to transmit an SC-FDMA signal on the first antenna; and for each of three other antennas, modulate the M sub-carriers of the sub-band sequentially using a respective one of the three cyclic shift delayed versions of the reference sequence of M discrete time domain values to transmit an SC-FDMA signal on the three other antennas.

5. An apparatus for single carrier frequency division multiple access (SC-FDMA) uplink transmission diversity in a wireless communication device having $N_A$ antennas, $N_A=2$, comprising:

for a group of N modulated data symbols:

means for performing an N-point discrete Fourier transform (DFT) on the N modulated data symbols to generate a set of N frequency domain components of the N modulated data symbols;

means for mapping the N frequency domain components of the N modulated data symbols to N sub-carriers in a sub-band M sub-carriers wide (M>N) to generate a set of M complex subcarrier amplitudes;

means for performing an M-point inverse discrete Fourier transform (IDFT) on the set of M complex sub-carrier amplitudes to generate a reference sequence of M discrete time domain values;

means for generating a shift delayed version of the reference sequence of M discrete time domain values that is cycle shifted by M/4 relative to the reference sequence;

means for transmitting an SC-FDMA signal on one of the $N_A$ antennas using the reference sequence of discrete time domain values; and for the other antenna, means for transmitting a respective SC-FDMA signal generated using the cyclic shift delayed version of the reference sequence of M discrete time domain values.

6. An apparatus for single carrier frequency division multiple access (SC-FDMA) uplink transmission diversity in a wireless communication device having $N_A$ antennas, $N_A=4$, comprising:

for a group of N modulated data symbols:

means for performing an N-point discrete Fourier transform (DFT) on the N modulated data symbols to generate a set of N frequency domain components of the N modulated data symbols;

means for mapping the N frequency domain components of the N modulated data symbols to N sub-carriers in a sub-band M sub-carriers wide (M>N) to generate a set of M complex subcarrier amplitudes;

means for performing an M-point inverse discrete Fourier transform (IDFT) on the set of M complex sub-carrier amplitudes to generate a reference sequence of M discrete time domain values;

means for generating three cyclic shift delayed versions of the reference sequence of M discrete time domain values that are cycle shifted by M/4, −M/4 and M/2 relative to the reference sequence, respectively;

means for transmitting an SC-FDMA signal on a first one of the $N_A$ antennas using the reference sequence of discrete time domain values; and for each one of the other $N_A$ antennas, means for transmitting a respective SC-FDMA signal generated using a respective one of the three cyclic shift delayed versions of the reference sequence of M discrete time domain values.

* * * * *